United States Patent Office 3,784,616
Patented Jan. 8, 1974

3,784,616
DECOMPOSITION OF OXALATES TO FORM ALDEHYDES AND ALCOHOLS
Donald M. Fenton, Anaheim, Calif., assignor to Union Oil Company of California, Los Angeles, Calif.
No Drawing. Filed Sept. 16, 1971, Ser. No. 181,274
The portion of the term of the patent subsequent to Sept. 22, 1987, has been disclaimed and dedicated to the Public
Int. Cl. C07c 31/02, 27/00
U.S. Cl. 260—638 R    6 Claims

ABSTRACT OF THE DISCLOSURE

A process for the preparation of aldehydes and alcohols comprising contacting a dihydrocarbyl oxalate with a catalyst comprising a complex of a Group VIII noble metal and a biphyllic ligand at a temperature between 150° C. and 250° C. and at a pressure sufficient to maintain liquid phase reaction conditions. Soluble complexes of zero valent iron are cocatalysts for this reaction. The products produced, chiefly alcohols with some aldehydes, formate esters and ethers are useful as intermediates for a variety of products including plasticizers, acids and resins, etc.

DESCRIPTION OF THE INVENTION

The invention relates to a process for preparing alcohols and aldehydes by the decomposition of dihydrocarbyl oxalates. The invention comprises decomposing a dihydrocarbyl oxalate, e.g., dibutyl oxalate

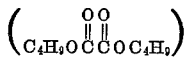

by contacting, at relatively mild reaction conditions, the oxalate with a Group VIII noble metal catalyst in complex with a biphyllic ligand (e.g., triphenylphosphine) to form the corresponding alcohol, e.g., butanol, with butyraldehyde, ethers and butylformate. In a preferred embodiment, a zero valent iron complex is used as a cocatalyst.

The oxalates are byproducts in the oxidative carbonylation of olefins to esters of alpha,beta-unsaturated acids and/or beta-acyloxy substituted carboxylic acids. The products from this reaction are in general more useful and more valuable than the oxalates and, hence, the process of the invention can be used to convert the byproduct oxalates to useful products.

The dihydrocarbyl oxalates that can be converted by the process of this invention have from 4 to about 25 carbons and have the following general formula:

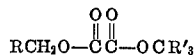

wherein R and R' are hydrogen or the same or different alkyl, alkenyl, or monocyclic aryl, alkaryl, cycloalkyl, or cycloalkenyl having 1 to about 20 carbons and preferably having 1 to about 12 carbons.

Examples of the above radicals are methyl, hexyl, nonyl, tridecyl, octadecyl, pentenyl, octenyl, nonenyl, phenyl, tolyl, pseudocumenyl, xylyl, tetramethylphenyl, cyclopropyl, cyclooctyl, cylopentenyl and cyclononenyl. Preferably, R and R' are lower alkyl, e.g., methyl, ethyl, propyl, butyl, pentyl, hexyl, heptyl, octyl, etc., preferably having 1 to about 12 carbons and preferably $RCH_2$ and $R'_3$ are the same. Suitable oxalates include dimethyl oxalate, diethyl oxalate, dipropyl oxalate, dibutyl oxalate, diisobutyl oxalate, dipentyl oxalate, di-2-methylpentyl oxalate, diheptyl oxalate, butyl ethyl oxalate, octyl cyclohexyl oxalate, dioctyl oxalate, didecyl oxalate, didodecyl oxalate, dibutenyl oxalate, propyl pentenyl oxalate, dinonenyl oxalate, methylbenzyl oxalate, di-beta-phenethyl oxalate, butyl benzyl oxalate, dicyclobutyl oxalate, dicyclohexyl oxalate, dicyclononyl oxalate, dicyclohexenyl oxalate, dicyclononenyl oxalate, etc.

The major product of the reaction is the alcohol corresponding to that of the oxalate ester although the formate ester of the alcohol is also produced along with the aldehyde and ether thereof. For example, when dioctyl oxalate is decomposed octanol and octyl formate are the major products and some octanal and octyl octenyl ether are obtained.

The catalyst of the invention comprises a Group VIII noble metal in complex with a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these, the phosphorus compounds, i.e., the phosphines, are preferred; however, the arsines, stibines and bismuthines can also be employed. In general, these biphyllic ligands have the following structure:

$$E(R)_3$$

wherein E is trivalent phosphorus, arsenic, antimony or bismuth; and
wherein R is the same or different alkyl having 1 to about 10 carbons, cycloalkyl having 4 to about 10 carbons or aryl having 6 to about 10 carbons; examples of which are methyl, butyl, nonyl, cyclohexyl, cyclodecyl, phenyl, tolyl, xylyl, tetramethylphenyl, etc. Preferably at least one or two of the R groups are aryl, e.g. phenyl, tolyl, xylyl, etc., having 6 to 9 carbons and, most preferably, the ligand is triaryl.

Examples of suitable biphyllic ligands having the aforementioned structure and useful in my invention to stabilize the catalyst composition are the following:

trimethylphosphine,
triethylarsine,
triethylbismuthine,
triisopropylstibine,
dioctylcycloheptylphosphine,
tricyclohexylphosphine,
ethyldiisopropylstibine,
tricyclohexylphosphine,
methyldiphenylphosphine,
methyldiphenylstibine,
triphenylphosphine,
triphenylbismuthine,
tri(o-tolyl)phosphine,
phenyldiisopropylphosphine,
phenyldiamylphosphine,
ethyldiphenylphosphine,
phenylditolylphosphine,
xylyldiphenylarsine,
tolydi(m-xylyl)stibine,
trixylylphosphine,
trixylylarsine,
trixylylstibine,
cyclopentyldixylylstibine,
dioctylphenylphosphine,
tridurylphosphine,
trixylylbismuthine, etc.

Of the aforementioned, the mono-, di- and tri-aryl phosphines and particularly the triarylphosphines (e.g., triphenylphosphine) are preferred because of their greater activity.

The Group VIII noble metal may be ruthenium, rhodium, palladium, osmium, iridium or platinum. A catalytic quantity of the metal is added, e.g., 0.002 to 2 percent of the reaction medium, and the metal may be added as a soluble salt, a carbonyl, a hydride or as a chelate.

A cocatalyst for the reaction is a complex of iron in the zero valent state. Examples of suitable complexes are those of iron with any of the aforementioned biphyllic ligands or iron pentacarbonyl, bis-triphenylphosphine iron tricarbonyl. When an iron cocatalyst is used, catalytic quantities, e.g., from 0.002 to 2 percent of the reaction medium, can be used.

The Group VIII noble metal or iron may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess, e.g., 10 to 300 percent of that stoichiometrically required to form a complex with the Group VIII metal. The complex has from 1 to about 5 moles of biphyllic ligand per atom of the metal and other components such as hydride, or soluble anions such as sulfate, nitrate, $C_1$–$C_5$ carboxylates, e.g., acetate, propionate, isobutyrate, valerate, etc., halide, etc. may be but need not be included in the complex catalyst of this invention. These components may be incorporated in the catalyst by the formation of the catalyst from a Group VIII metal salt of the indicated anions.

Examples of suitable sources of the noble metals are as follows: iridium carbonyl chloride, iridium carbonyl hydride, iridium carbonyl bromide, iridium tetrabromide, ridium tribromide, iridium trifluoride, iridium trichloride, osmium trichloride, chloroosmic acid, palladium hydride, pallados chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloroethylene platinate(II), chloropentaaminorhodium(III) chloride, rhodium dicarbonyl chloride dimer, rhodium nitrate, rhodium trichloride, rhodium carbonyl hydride, ruthenium trichloride, tetraaminorutheniumhydroxychloro chloride; etc. Eaxmples of suitable sources for the iron cotatalyst are iron powder or any of the aforementioned iron complexes.

The reaction is performed under liquid phase conditions and may be performed in a liquid organic solvent (i.e., has a solvency for the reactants and the catalyst) inert to the reactants, products and to the reaction conditions. Suitable solvents include, for example, hydrocarbons, ketones and ethers. Examples of the foregoing are pentane, hexane, heptane, isooctane, naphtha, cyclohexane, indane, benzene, toluene, xylene, tetralin, acetone, diethyl ketone, diisopropyl ketone, methyl-n-amyl ketone, cyclohexanone, di-iso-propyl ether, di-n-butyl ether, ethylene glycol di-iso-butyl ether, methyl o-tolyl ether, diethyl ether, etc. Preferably, however, the reaction is conducted in the absence of a solvent in which case the reaction can be conducted such that a substantial amount of the oxalate reactant may be present by, for example, in the batch process, terminating the reaction prior to most of the oxalate being decomposed, or for example in the continuous process, adding sufficient oxalate into the contacting zone to maintain the required oxalate level.

The reaction is performed at relatively low temperatures, e.g., 100° to 400° C. and preferably 150° to 250° C. and at low pressures, e.g., 1 to 30 atmospheres, preferably 4 to 10 atmospheres (the pressures herein being on an "absolute" basis as opposed to a "gauge" basis) and sufficient to maintain liquid reaction conditions. The decomposition releases gaseous carbon monoxide and therefore lower pressures, in addition to higher temperatures, favor the decomposition. Hence, the reaction is preferably performed at the lowest pressure required to maintain liquid phase at the reaction temperature and the optimization of the rate of decomposition involves correlating temperature and pressure in conventional manner. The gas phase can comprise chiefly the generated carbon monoxide, however, an inert gas such as nitrogen may also be introduced into the reaction zone in order to provide the necessary pressure and to reduce the partial pressure of carbon monoxide to a low value, e.g., from 0.1 to 60 percent of the total pressure. The necessary heat can be supplied by circulating part of the medium through a heater in indirect heat exchange with steam or with other suitable heating fluids.

The addition of certain anhydrous, organic sulfonic acids to the reaction medium generally improves the rate of decomposition of the oxalate and the yield of aldehyde. Aliphatic and aromatic sulfonic acids having at most about 10 carbons such as methane sulfonic acid, ethanesulfonic acid, propanesulfonic acid, butanesulfonic acid, etc.; benzenesulfonic acid, toluenesulfonic acid, xylenesulfonic acid, cumenesulfonic acid, naphthalenesulfonic, acid, etc., are suitable ahydrous organic sulfonic acids. The acid is added in catalytic quantities, e.g., 0.00 5 to 5 percent of the reaction medium.

The reaction may be carried out in a "batch" or in a continuous process. In the batch process, the reaction is continued until a substantial amount or all of the oxalate has decomposed with the excess carbon monoxide being vented to the atmosphere. The products, reactant oxalate, catalyst and solvent, if any, are separated by conventional means (e.g., distillation). In the continuous process, oxalate is continuously fed into the reaction zone, the carbon monoxide vented and a slip stream of the reactant, products, catalyst and solvent, if any, is continuously withdrawn and separated by distillation. The reactant, catalyst and solvent, if any, are then recycled to the reaction zone.

The following examples will serve to illustrate the practice of the invention; however, the invention should not be limited to the processes described therein.

Examples

To a 250 milliliter round bottom flask were introduced 100 milliliters of dibutyl oxalate, 1.5 grams of palladium chloride bistriphenylphosphine and 3.0 grams of triphenylphosphine. The flask was equipped with a Dean-Stark tube and the mixture was heated to and maintained at reflux for about 2 hours. About 2 milliliters of liquid products were distilled comprising 21 percent butenyl butyl ether, 2 percent butyraldehyde, 17 percent butanol and 53 percent butyl formate. To the residue in the flask was then added 2 milliliters iron pentacarbonyl and 0.5 gram iodine. The flask contents were heated to and maintained at reflux for 2 hours and 10 milliliters of distillate were collected comprising 2 percent butyl butenyl ether, 4 percent butyraldehyde, 32 percent butyl formate and 58 percent butanol.

When the experiment is repeated with the substitution of dicyclohexyl oxalate, cyclohexanol is the major product with lesser amounts of cyclohexyl formate and cyclohexanone.

The preceding examples illustrate the best mode of practice of the invention presently contemplated. Other oxalates, solvents or catalyst complexes described hereinabove can readily be substituted for those illustrated without substantial changes to the illustrated mode of practice.

I claim:

1. The process of decomposing a dihydrocarbyl oxalate to form an alcohol comprising contacting a reaction mixture consisting essentially of an oxalate having from 4 to 25 carbons and having the formula:

wherein R and R' are hydrogen or the same or different alkyl or alkenyl having from 1 to about 20 carbons or monocyclic aryl, alkaryl, cycloalkyl or cycloalkenyl having 6 to about 8 carbons;

palladium and a triarylphosphine, said palladium being in a complex with from 1 to 5 moles of said triarylphosphine per atom of palladium, said triarylphosphine having the formula:

$$P(R'')_3$$

wherein R'' is the same or different aryl having 6 to about 12 carbons;

at a temperature between about 100° and 400° C. and at a pressure sufficient to maintain liquid phase reaction conditions.

2. The process of claim 1 wherein R'' has 6 to about 9 carbons.

3. The process of claim 2 wherein said ligand is triphenylphosphine.

4. The process of claim 3 wherein the oxalate is a, saturated, aliphatic oxalate.

5. The process of claim 1 wherein said triarylphosphine is present in an amount from 10 to 300 percent in excess of the amount in said complex.

6. The process of claim 1 wherein said temperature is maintained from 150° to 250° C.

References Cited
UNITED STATES PATENTS

| 3,530,168 | 9/1970 | Biale | 260—485 R |
| 1,070,755 | 6/1967 | Great Britain | 260—622 R |

JOSEPH E. EVANS, Primary Examiner

U.S. Cl. X.R.

260—410, 410.9 R, 491, 586 R, 601 R, 614 AA, 617 R, 617 M, 618 R, 631 R, 643 R